United States Patent [19]
Gravel et al.

[11] Patent Number: 5,131,750
[45] Date of Patent: Jul. 21, 1992

[54] EIGENFREQUENCY PHASE SHIFT CONTROL LOOP

[75] Inventors: David E. Gravel, Wallingford; Charles R. Winston, Jr., North Canton, both of Conn.

[73] Assignee: Honeywell Inc., Minneapolis, Minn.

[21] Appl. No.: 533,189

[22] Filed: Jun. 4, 1990

[51] Int. Cl.$^5$ .............................................. G01C 19/64
[52] U.S. Cl. ...................................................... 356/350
[58] Field of Search ......................................... 356/350

[56] References Cited

U.S. PATENT DOCUMENTS

4,874,244 10/1989 Kersey ................................. 356/350

Primary Examiner—Vincent P. McGraw
Attorney, Agent, or Firm—Donald J. Lenkszus

[57] ABSTRACT

A fiber optic rotation sensor having a pair of light beams counterpropagating in a loop includes a phase modulator for modulating the waves at a first frequency, upon exiting the loop the waves are combined into a light intensity signal indicative of rotation rate and is sensed. A signal at the first frequency is quadrature phase shifted by a lower frequency signal and summed with the sensed rate signal, an amplifier amplifies the summed signals, the amplifier also inherently induces undesirable phase shifts by an equal amount in both the sensed rate signal and the quadrature signal. The quadrature signal is demodulated and used in feedback fashion to control the phase of a variable phase shifter which provides a signal at the first frequency whose phase is shifted by an amount equal to the undesirable phase shift of the sensed rate signal, the variable phase shifter signal and the sensed rate signal being provided to a demodulator to demodulate rotation rate information from the sensed rate signal.

10 Claims, 4 Drawing Sheets

EIGENFREQUENCY PHASE SHIFT CONTROL LOOP

DESCRIPTION

1. Technical Field

This invention relates to fiber optic rotation sensors, and more particularly to such systems having the ability to compensate for undesirable phase shifts in the sensed rotation rate signal

2. Background Art

A fiber optic gyro (FOG) is an interferometric rate sensitive device used, e.g., in modern guidance systems for sensing rotational rate. The basic underlying principle of the FOG is the Sagnac effect. When two light beams counterpropagate in a fiber optic coil rotating about an axis perpendicular to the plane of the coil, the optical transit time of the light beams depends on the coil rotation rate and direction. A Sagnac phase difference between the two beams results which is proportional to, and thus serves as a measure of, rotation rate.

When the beams are added interferometrically, the total light intensity is a cosine function of the Sagnac phase difference. Because of this, measuring the Sagnac phase difference is difficult with a conventional DC detection system, especially at low rotation rates. To overcome this, an AC optical phase dither, e.g., a sine wave or square wave modulation, is applied at one end of the coil. The dither modulation adds AC dither to the Sagnac phase difference between the two beams and improves FOG sensitivity to small rotation rates. The dither modulation acts on each light beam at different times due to the optical transit time delay in the coil. FOG operation is optimized when the dither frequency equals one half times the reciprocal of the coil transit time, i.e., the coil eigenfrequency.

It is common to use a FOG in a closed loop configuration in which the total intensity of the beams is used to add a second phase bias to the counterpropagating beams to null out the Sagnac phase difference. In contrast to the open loop output (intensity) which varies sinusoidally with rate, the added phase bias, like the Sagnac phase, varies linearly with rate. The second bias is applied by a serrodyne phase modulator driven by a repeating linear ramp signal, the peak ramp amplitude of which is held constant at 2 * PI radians and the ramp flyback period is essentially instantaneous. The slope of the ramp (and thus its frequency) is varied in accordance with the sensed rotation rate. With the Sagnac phase shift nulled, the frequency of the ramp is indicative of rotation rate.

Thus, in a typical FOG operation, the light beams are modulated and demodulated at the eigenfrequency to obtain rotation rate information. This information is fed to the serrodyne modulator to null out the rotation induced phase shift. Since the demodulator is phase-sensitive, the requirement for perfect demodulation of the rate signal and perfect rejection of unwanted signals in quadrature with the rate signal is for the demodulator reference signal to be exactly in phase with the rotation rate signal at the eigenfrequency.

Normally, the dither modulator and optics contribute little or no phase shift between the serrodyne modulator excitation signal and the rate signal. However, the rate signal is small in amplitude and must be amplified before being demodulated. The phase shifts added by the pre-demodulation amplification cause the phase of the rate signal to be shifted from that of the dither modulator excitation. The phase shift is due to the limited gain-bandwidth products of operational amplifiers, combined with the large gains and high eigenfrequencies (e.g., approximately one MHz for a 100 meter coil) required by some FOG applications. This phase shift can be relatively large and it typically varies from part to part and over a wide temperature range.

DISCLOSURE OF INVENTION

Objects of the present invention include the provision of compensation for the aforementioned undesirable phase shift in the measured rotation rate signal.

According to the present invention, a fiber optic rotation sensor having a pair of light waves counterpropagating in a loop includes a phase modulator for modulating the waves at a first frequency, upon exiting the loop the waves are combined into a light intensity signal indicative of rotation rate which is sensed, a signal at the first frequency is quadrature phase shifted by a lower frequency signal and summed with the sensed rate signal, an amplifier amplifies the summed signals, the amplifier also inherently induces undesirable phase shifts by an equal amount in both the sensed rate signal and the quadrature signal, the quadrature signal is demodulated and used in feedback fashion to control the phase of a variable phase shifter which provides a signal at the first frequency whose phase is shifted by an amount equal to the undesirable phase shift of the sensed rate signal, the variable phase shifter signal and the sensed rate signal being provided to a demodulator to demodulate rotation rate information from the sensed rate signal.

The present invention has utility in compensating for undesirable and inherent variable phase shifts in the measured rotation rate signal in a fiber optic rotation sensor, the variable shifts due in part to thermal and aging factors. The result is a more accurate measure of rotation rate. Also, the present invention does not undesirably change the magnitude of the sensed rate signal since the shifted eigenfrequency signal is added in quadrature to the sensed rate signal and also since the frequency of the low frequency carrier is beyond the bandwidth of the sensor's signal processing electronics.

These and other objects, features and advantages of the present invention will become more apparent in light of the following detailed description of a best mode embodiment thereof as illustrated in the accompanying drawing.

BEST MODE FOR CARRYING OUT THE INVENTION

Figure 1:
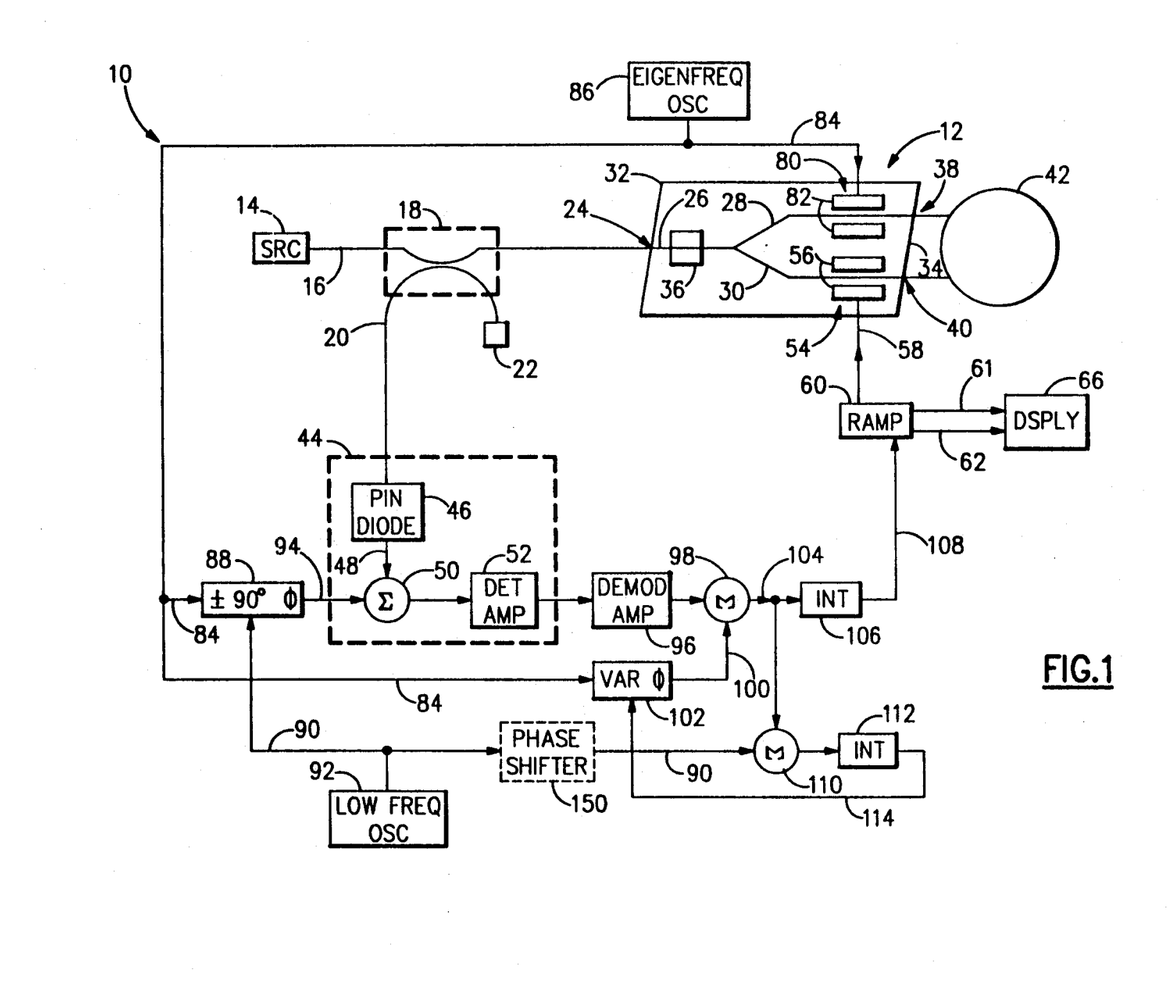
FIG. 1 illustrates a schematic block diagram of a hybrid fiber/integrated optic fiber optic gyro containing the apparatus of the present invention.

Illustrated in FIG. 1 is a modern interferometric fiber optic rotation sensor, specifically a fiber optic gyro (FOG) 10 of the hybrid fiber/integrated optic (IO) type. The FOG has a number of system components fabricated directly onto an IO device 12, with the remainder of the system components external thereto As compared to prior art all-fiber FOG designs, the IO device 12 improves FOG system closed-loop performance.

The FOG 10 includes a low coherence light source 14, e.g., a galium arsenide (GaAs) laser, which outputs a beam of low coherence light at a wavelength of, e.g., 0.8 microns, into a single mode optical fiber 16. The light propagates through the fiber 16 to a fiber optic directional coupler 18. The coupler 18 may have a coupling coefficient of, e.g., 50%; thus, half of the light input to the coupler from the source 14 is coupled by evanescent field coupling into a second fiber 20 and is terminated non-reflectively by a light-absorbing terminator 22. A suitable fiber optic directional coupler is described in U.S. Pat. No. 4,735,506 to Pavlath, which is hereby incorporated by reference.

The portion of the light not lost from the coupler 18 propagates through the fiber 16 to a port 24 of the IO device 12. If desired, the coupler may attach directly to the IO device, thus eliminating any fusion splices and reducing component connections and associated alignments. Means and method for mounting optical fibers to an IO device are disclosed in commonly owned U.S. Pat. No. 4,871,226 to Courtney et al., which is hereby incorporated by reference.

The IO device may be comprised of, e.g., lithium niobate, $LiNbO_3$, or lithium tantalate, with waveguides 26,28,30 being formed therein by known titanium indiffusion or proton exchange techniques. As illustrated in FIG. 1, the endfaces 32,34 of the IO device are angled at approximately, e.g., ten (10) degrees to reduce interface reflections between the IO device and the fibers.

After entering the IO device 12, the light propagates along the waveguide 26 where it undergoes polarization by a polarizing filter 36. The polarizer 36 transforms the arbitrary polarization state of the light into a desired polarization state, which is required to insure reciprocity in FOG performance. As described hereinafter, the light also passes through the polarizer after propagating through the fiber coil. Passing the light through the polarizer in both directions of travel eliminates the birefringence phase difference caused by the different velocities of propagation in the two possible polarization modes.

Upon leaving the polarizer, the light propagates along the waveguide 26 until split into two equal beams. Each beam propagates along the corresponding waveguide 28,30 until it exits the IO device at an appropriate port 38,40. Coupled to each port 38,40 is an end of a coil 42 of fiber optic cable, through which the light beams counterpropagate before reentering the IO device 12. The coil 42 comprises the rotation rate sensing loop of the FOG 10.

In accordance with the well-known Sagnac effect, any rotation of the coil about an axis perpendicular to the plane of the coil causes the counterpropagating light beams to travel unequal distances with respect to one another. Rotation rate is determined by recombining the beams interferometrically and sensing the amount of phase difference therebetween with a photodetector. The light intensity varies since, due to rotation, the light beams are at different phases with respect to one another.

The diameter of the coil and length of the fiber are application-specific. To gain sensitivity, a large coil diameter, e.g., three inches, is desired. On the other hand, the fiber length is a tradeoff between cost, sensitivity and electronic signal processing considerations. As fiber length decreases, the optimal eigenfrequency increases, which increases the complexity of the demodulator circuit. In general, fiber lengths in the 100 to 300 meter range are common.

After propagating through the coil 42, each light beam reenters the IO device and propagates in the corresponding waveguide 28,30 in a reverse direction from which it originally came from the source 14. The beams then recombine into one beam, pass through the polarizer 36, and exit the IO device at the port 24. The beam then propagates along the fiber 16 to the coupler 18, which couples, e.g., 50% of the beam along the second fiber 20 to a detector 44.

The detector 44 may typically comprise a known PIN photodiode or avalanche photodiode (APD). APDs offer high sensitivity and better signal to noise ratios for small signals. However, APDs require more complex support circuitry, including a stable high voltage supply. On the other hand, PIN diodes require simple support circuitry and low voltage, and have relatively good temperature stability and a lower cost.

In FIG. 1, the detector 44 comprises in part a PIN diode 46. The PIN diode senses light impinging thereon and converts the light into an electrical signal. The electrical signal is provided on a line 48 to a summing junction 50, which typically comprises the inverting input of an operational amplifier (op-amp). The summing junction output is fed to a detector transimpedance amplifier 52, which comprises the aforementioned op-amp connected in the known inverting amplifier configuration (not shown), i.e., with a resistor connected between the output and inverting input and with the non-inverting input connected to ground.

In a typical FOG processing scheme for the rotation rate signal, it is known to use both open and closed loop configurations. In an open loop FOG, the rotation rate signal is determined from the intensity of the recombined light beam signal. The closed loop approach uses the rotation rate signal to induce a phase bias into the light beams counterpropagating in the fiber coil. This phase bias is equal to the negative of the rotation-induced Sagnac phase shift, which nulls out the Sagnac phase shift. Thus, the induced phase shift is a measure of the rotation rate.

As compared to an open loop system, a closed loop system has reduced sensitivity to environmental errors, linear scale factor, and extended dynamic range. The present invention may be implemented in either an open-loop or closed-loop FOG. A closed-loop FOG is illustrated in FIG. 1.

To achieve the desired nulling phase shift of the light beams, a phase modulator 54 is fabricated on the IO device along one waveguide 30. The phase modulator 54 may be driven by a repetitively linear ramped or staircased electrical signal. If the peak ramp or staircase amplitude is 2 * PI radians, and the flyback following each ramp segment is essentially instantaneous, the resulting serrodyne modulation acting on the counterpropagating light beams at different times produces an effectively constant phase difference between the two beams. The magnitude of the phase bias is proportional to the ramp slope (and thus its frequency), which constitutes an easily and accurately measurable representation of FOG rotation rate.

The serrodyne modulator 54 is fabricated on the IO device 12 by depositing metal electrodes 56, utilizing a known photolithographic process similar to that used in the microelectronics industry. The signal driving the serrodyne modulator is typically bipolar in nature and is supplied on a line 58 from known ramp generation circuitry 60. The ramp circuitry also includes counter circuitry which determines the polarity of the bipolar signal and provides a pair of signals on lines 61,62 to a suitable display device 66 for display of rotation rate. A first signal on the line 61 is indicative of positive rotation rate while a second signal on the line 62 is indicative of negative rotation rate.

Figure 2:
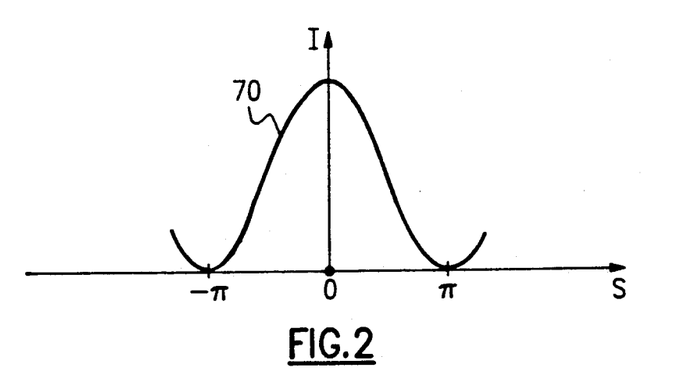
FIG. 2 illustrates a graph of light intensity versus rotation rate phase difference as may be measured in the fiber optic gyro of FIG. 1.

When the FOG 10 is at rest (i.e., no rotation), the counterpropagating beams in the coil 42 travel equal path lengths and are of equal phase at the detector 44, resulting in maximum light intensity. FIG. 2 illustrates a graph 70 of the cosine relationship between the intensity (I) of the optical signal (i.e., the recombined light beam) at the detector and the Sagnac rotational phase difference (S) between the counterpropagating light beams. The Sagnac phase difference in radians is given by:

$$S = ((2 * PI * L * D)/ WL * C) * RR \quad \text{(equ. 1)}$$

where:
L is the fiber coil length in meters; D is the diameter of the fiber coil in meters; WL is the wavelength of light in the coil in meters; C is the speed of light in meters per second; RR is the rotation rate in radians per second.

The intensity, I, of the light beam impinging on the detector is a function of the Sagnac phase difference between the light beams, as given by:

$$I = I_1 + I_2 + 2(I_1 * I_2)^{\frac{1}{2}} * COS(S) \quad \text{(equ. 2)}$$

where:
$I_1$ and $I_2$ are the intensities of the individual light beams counterpropagating in the coil.

FIG. 2 is a graph 70 of equation 2. Thus, the intensity of the light beam at the detector is maximum when the Sagnac phase difference is zero. However, due to the cosine nature of the curve, the signal intensity is relatively insensitive to small changes in phase difference between the counterpropagating beams, these small phase changes being caused by correspondingly small rotation rates. Such insensitivity makes it difficult to transform the intensity at the detector into an accurate signal indicative of rotation rate.

Figure 3:
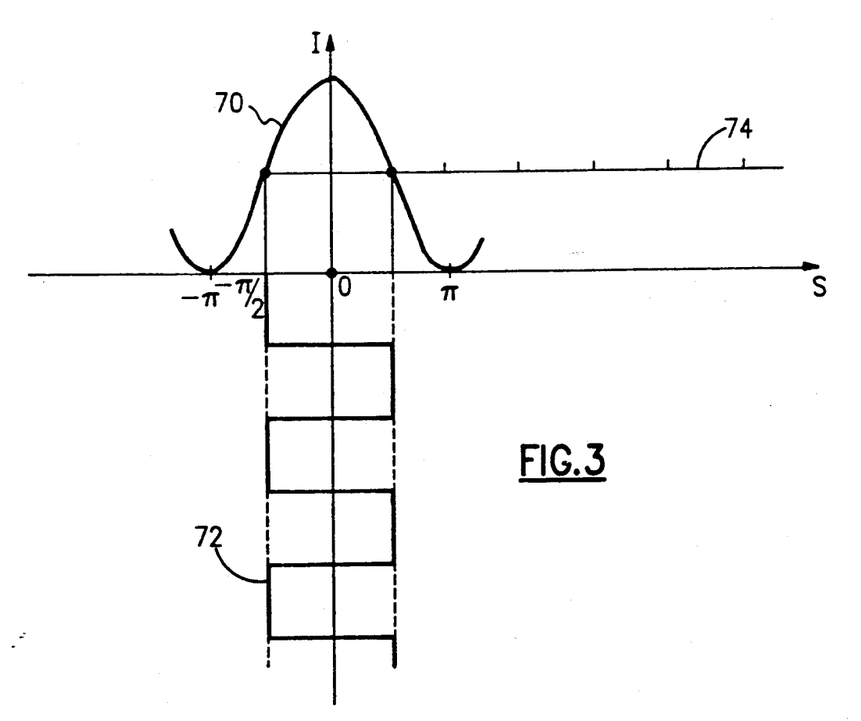
FIG. 3 illustrates the graph of FIG. 2 with a square wave modulation signal and the resulting output of the fiber optic gyro of FIG. 1 with no gyro rotation.

Referring to FIG. 3, it is known to induce an additional dither phase bias onto the counterpropagating beams to maximize FOG sensitivity at low rotation rates. The dither phase bias may be a square wave modulation imposed on one end of the fiber coil, as illustrated by the waveform 72. However, it is to be understood that a sinusoidal modulation may be used, if desired. FIG. 3 illustrates the FOG with zero rotation, resulting in a DC level output waveform 74.

Figure 4:
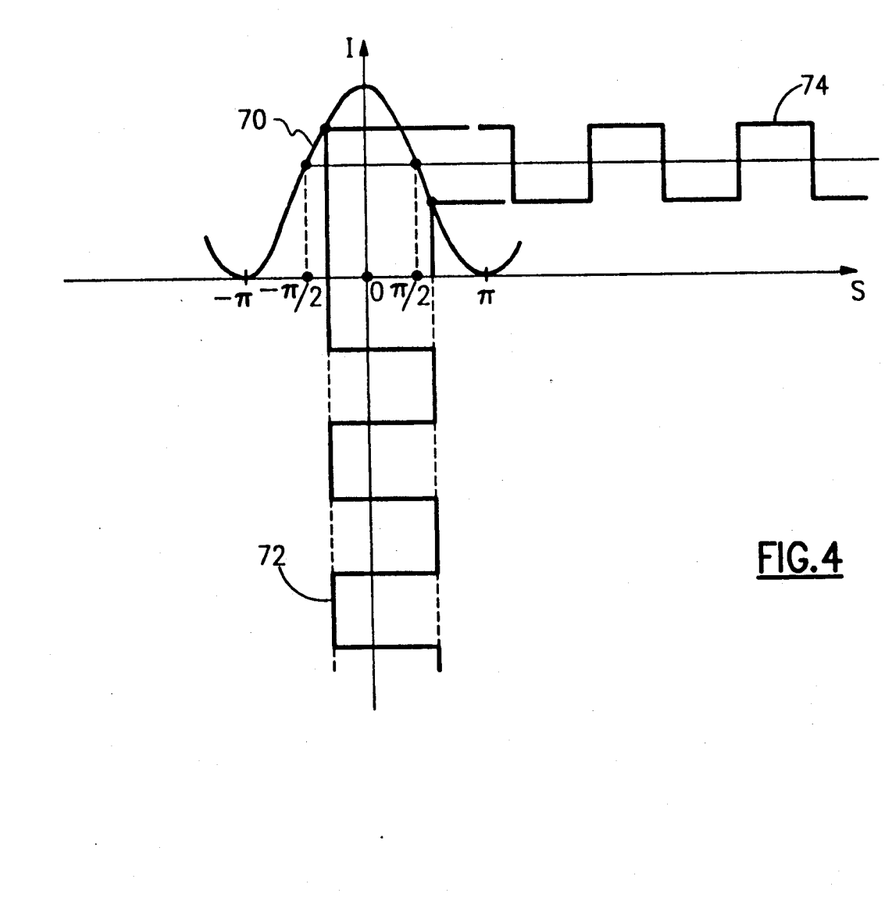
FIG. 4 illustrates the graph of FIG. 2 with a square wave modulation signal and the resulting output of the fiber optic gyro of FIG. 1 with the gyro undergoing rotation.

Referring to FIG. 4, during rotation, the square wave bias 72 is asymmetric about the cosine characteristic and the output waveform 74 contains a component of the modulation frequency. The amplitude of the output waveform is related to the phase shift in a sinusoidal fashion (as opposed to cosinusoidally). This results in increased and approximately linear FOG sensitivity at low rotation rates. Also, by making the modulation frequency equal to one-half times the reciprocal of the optical transit time through the loop (i.e., the eigenfrequency), the effectiveness of the dynamic bias modulation is optimized, the effects of certain error sources (such as inadvertent amplitude modulation and duty cycle asymmetry) are minimized, and overall FOG performance is improved. Known synchronous demodulation techniques may be used with this square wave dither modulation.

Referring to FIG. 1, the dither phase bias is induced by placing an optical phase modulator 80 along the waveguide 28. The dither modulator 80 is fabricated on the IO device 12 using a pair of electrodes 82 in a similar fashion to the serrodyne modulator 54 described hereinbefore. The dither modulator is driven by a signal on a line 84 from a square wave oscillator 86 at the eigenfrequency.

In accordance with the present invention, the output of the eigenfrequency oscillator on the line 84 is fed to a +/−90 degree (quadrature) phase shifter 88, which shifts the phase of the eigenfrequency signal plus or minus ninety (90) degrees. This phase shifting is in response to a square wave modulation signal on a line 90 from a low frequency oscillator 92. The modulation signal has a peak to peak amplitude of 180 degrees at a relatively low frequency of, e.g., 10 KHz, the 10 KHz frequency being higher than the bandwidth of the sensor's signal processing electronics. A quadrature signal on a line 94 from the quadrature phase shifter 88 is fed to the summing junction 50. The detector transimpedance amplifier 52 provides an amplified signal to a demodulator amplifier 96.

The output of the demodulator amplifier 96 is fed to a first mixer 98 (i.e., demodulator), the other input of which is provided on a line 100 from a variable phase shifter 102. The input to the variable phase shifter 102 is the output of the eigenfrequency oscillator 86 on the line 84.

The output of the first mixer 98 is provided on a line 104 to a first integrator 106, which integrates the resulting rotation rate signal out of the first mixer and provides an integrated rate signal on a line 108 to the ramp circuitry 60. The output of the first mixer is also provided on the line 104 to a second mixer 110 (demodulator), the other input of which is the output of the low frequency oscillator 92 on the line 90. The output of the second mixer 110 is fed to a second integrator 112, which integrates the second mixer output signal and provides an integrated output signal on a line 114. As described hereinafter, this integrator output signal adjusts the phase of the output of the variable phase shifter 102 according to the amount of unwanted phase shift of the rotation rate signal.

In operation, the present invention measures the unwanted phase shift to the sensed rate signal caused by both the detector transimpedance amplifier 52 and demodulator amplifier 96 and compensates for it while applying the rate signal to the ramp circuitry. First, the modulated square wave signal on the line 94 is added in quadrature to the measured rate signal on the line 48. Then, the detector transimpedance amplifier and demodulator amplifier undesirably shift the phase of both the square wave signal and rate signal by an equal amount.

Passing through the first mixer 98 is the low frequency component of the shifted modulated square wave signal, the amplitude of which is ideally zero when the loop is closed, and the undesirably phase shifted quadrature signal is in quadrature with the variably phase shifted reference signal. The amplitude of the low frequency component of this signal is demodulated at the second mixer 110 with the reference square wave modulation signal from the low frequency oscillator 92. The resultant magnitude and sign necessarily represents the amount and sense of undesired phase shift to the rate signal. This difference is integrated by the second integrator 112 and applied to the variable phase shifter, which shifts the phase of the eigenfrequency signal on the line 84 to exactly match the phase of the rate signal as applied to the first mixer. The undesired phase shift in the rate signal is thus cancelled out at the first mixer, and the resulting optimally demodulated rate information is fed to the first integrator.

Figure 5:
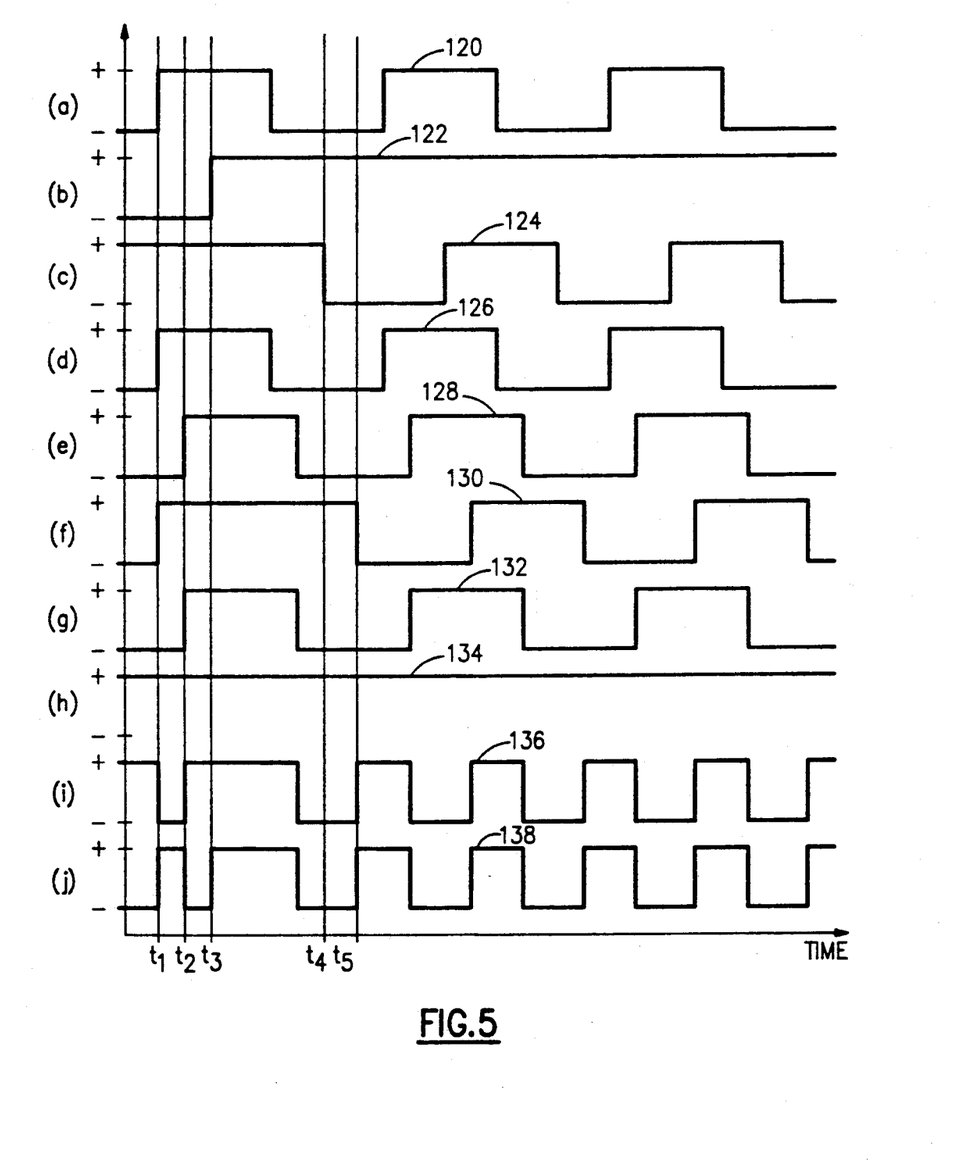
FIG. 5 illustrates signal waveforms as measured at various locations in the fiber optic gyro of FIG. 1.

Illustrated in FIG. 5, illustrations (a)-(j), are binary (positive, negative) logic state electrical signal waveforms measured at various points in the FOG of FIG. 1. FIG. 5(a) illustrates a waveform 120 of the eigenfrequency signal on the line 84 from the eigenfrequency oscillator 86. FIG. 5(b) illustrates a waveform 122 of the square wave modulation signal on the line 90 from the low frequency oscillator 92. This signal is at a frequency of, e.g., 1/100 times that of the eigenfrequency.

FIG. 5(c) illustrates a waveform 124 of the eigenfrequency signal on the line 94 at the output of the quadrature phase shifter 88. This signal alternately shifts its phase to either lead or lag the waveform 120 of the eigenfrequency signal by ninety degrees depending on the logic state of the square wave modulation signal waveform 122. FIG. 5(d) illustrates a waveform 126 of the sensed rotation rate signal on the line 48 from the PIN diode 46. In ideal operation of the present invention, the rotation signal waveform 126 is in phase with the eigenfrequency signal waveform 120. Although not shown, the rotation signal includes a component in quadrature with the eigenfrequency signal, this component being representative of an inherent error sensed by the rotating fiber coil.

FIG. 5(e) illustrates a waveform 128 of the rotation signal (FIG. 5(d)) after the inherent undesirable phase shift caused by the detector transimpedance amplifier and the demodulator amplifier (times T1-T2). In this exemplary embodiment, the phase shift is 45 degrees. However, it is to be understood that the amount of undesirable phase shift depends upon the component characteristics of the aforementioned amplifiers. FIG. 5(f) illustrates a waveform 130 of the eigenfrequency signal at the quadrature phase shifter output (FIG. 5(c)) after the phase shift of 45 degrees by the amplifiers (times T4-T5).

FIG. 5(g) illustrates a waveform 132 of the variable phase shifter output signal. As described hereinbefore, the first and second mixers 98,110 and the second integrator 112 control the phase of the variable phase shifter output 132 to equal the phase of the undesirably phase shifted rotation signal (FIG. 5(e)). FIG. 5(h) illustrates a waveform 134 of the undesirably phase shifted rotation signal after being mixed with the variable phase shifter output. Although not shown, the DC level of the signal of FIG. 5(h) is at its maximum value since this signal is at a constant positive logic level. That is, if the signal of FIG. 5(h) had excursions to the binary negative logic state, the DC level of that signal would be less than its maximum value. These negative excursions occur if the phase of the variable phase shifter output is unequal to the phase of the undesirably phase shifted rotation signal. Thus, the signal of FIG. 5(h) represents the ideal control state attained by the present invention, this signal being subsequently integrated by the first integrator 106 and fed to the ramp circuitry 60.

FIG. 5(i) illustrates a waveform 136 of the undesirably shifted quadrature phase shift signal after being mixed with the variable phase shifter output signal FIG. 5(j) illustrates a waveform of FIG. 5(i) after being mixed in the second mixer 110 with the square wave modulation signal 122 (FIG. 5(b)). The signal of FIG. 5(j) is fed to the second integrator 112 and the integrated signal is provided to the variable phase shifter 102. Although not shown, the DC level of FIG. 5(j) is nearly zero in the exemplary embodiment of FIG. 5, indicating that the present invention has reached the desired control state of zero phase difference between the rotation rate signal and the serrodyne modulator excitation signal.

If the phase of the undesirably shifted quadrature phase shift signal is not in quadrature with the phase of the output of the variable phase shifter (i.e., the two inputs to the first mixer), then the output of the second mixer would not have such a 50% duty cycle as illustrated in FIG. 5(j). Instead, the output signal of the second mixer would have a more asymmetrical duty cycle, the amount of asymmetry depending on the magnitude of the phase difference between the two input signals at the first mixer. It follows that the DC level of the asymmetric signal of FIG. 5(j) would not be zero, but instead would be either a positive or negative value the magnitude of which is proportional to the asymmetry. This DC level is then integrated and applied to the variable phase shifter such that the amount of the output of the second integrator causes the variable phase shifter to shift its phase accordingly so as to match the phase of the undesirably phase shifted rotation rate signal. The result is then the 50% duty cycle signal of FIG. 5(j).

Illustrated in phantom in FIG. 1 is an optional open loop phase shifter 150 fed by the signal from the low frequency oscillator on the line 90. The shifter 150 adds a few degrees of phase shift to the signal on the line 90 before applying it to the second mixer 110. The added phase shift makes the phase difference between the shifted rate signal (FIG. 5(e)) and the rate signal (FIG. 5(d)) essentially zero by compensating for the residual phase error between the shifted rate signal at the first mixer 98 and the signal on the line 100 from the variable phase shifter 102. This residual phase error is approximately equal to the phase shift between the shifted rate signal (FIG. 5(e)) and the rate signal (FIG. 5(d)), divided by the frequency ratio of the eigenfrequency signal (FIG. 5(a)) to the low frequency oscillator signal (FIG. 5(b)). Thus, the lower the frequency of the low frequency oscillator signal, then the lower the amount of the residual phase shift.

The present invention has utility in compensating for undesirable and inherent variable phase shifts in the measured rotation rate signal in a fiber optic rotation sensor, the variable shifts due in part to thermal and aging factors The result is a more accurate measure of rotation rate. Also, the present invention does not undesirably change the magnitude of the sensed rate signal since the shifted eigenfrequency signal is added in quadrature to the sensed rate signal and also since the frequency of the low frequency carrier is beyond the bandwidth of the sensor's signal processing electronics.

The present invention is illustrated for use in a closed-loop FOG. However, the present invention may be used, if desired, in an open-loop FOG, or other types of fiber optic rotation sensors in a manner which should be apparent from the teachings herein. Also, the invention is illustrated as variably shifting the phase of a signal at the coil eigenfrequency for subsequent demodulation of rotation rate information which itself is modulated at or near the eigenfrequency. Typically, the modulator is set at the coil eigenfrequency for FOG performance reasons. To fully demodulate the rotation rate information, the demodulator reference signal (i.e., the output from the variable phase shifter) is also at the eigenfrequency. It suffice, however, for the present invention that the modulation and demodulation frequencies be equal.

It suffice for the broadest scope of the present invention that a fiber optic rotation sensor having a pair of light beams counterpropagating in a loop includes a phase modulator for modulating the waves at a first frequency, upon exiting the loop the waves are combined into a light intensity signal indicative of rotation rate and is sensed, a signal at the first frequency is quadrature phase shifted by a lower frequency signal and summed with the sensed rate signal, an amplifier amplifies the summed signals, the amplifier also inherently induces undesirable phase shifts by an equal amount in both the sensed rate signal and the quadrature signal, the quadrature signal is demodulated and used in feedback fashion to control the phase of a variable phase shifter which provides a signal at the first frequency whose phase is shifted by an amount equal to the undesirable phase shift of the sensed rate signal, the variable phase shifter signal and the sensed rate signal being provided to a demodulator to demodulate rotation rate information from the sensed rate signal.

Although this invention has been shown and described with respect to detailed embodiments thereof, it will be understood by those skilled in the art that various changes in form and detail thereof may be made without departing from the spirit and scope of the claimed invention.

We claim:

1. A fiber optic rotation sensor, comprising:
   rate means, for providing a signal of first frequency and for providing a rate signal modulated onto said first frequency signal, said rate signal indicative of a rate of rotation of the sensor;
   oscillator means, for providing a low frequency signal;
   first phase shift means, responsive to said low frequency signal, for shifting the phase of said first frequency signal and for providing a signal whose phase is in quadrature with said rate signal;
   summing means, for summing said rate signal with said quadrature signal and for providing a summed signal indicative thereof;
   amplifier means, for amplifying said summed signal and for providing an amplified signal indicative thereof, said amplifier means also inherently inducing an undesirable phase shift of an equal amount in both of said rate signal and said quadrature signal;
   variable phase shift means, responsive to said first frequency signal, for providing a variably shifted signal;
   first demodulator means, for demodulating said summed signal with said variably shifted signal and for providing a demodulated rate signal indicative of a rate of rotation of the sensor, said first demodulator means also providing said quadrature signal at an output of said first demodulator means; and
   second demodulator means, for demodulating said quadrature signal with said low frequency signal and for providing a demodulated shift signal indicative thereof, said variable phase shifter means being responsive to said demodulated shift signal for providing said variable phase shifted signal, said variably phase shifted signal being indicative of the amount of the undesirable phase shift in the rate signal.

2. The rotation sensor of claim 1, wherein said rate means further comprises:
   light source means, for providing a light signal;
   means for splitting said light signal into two light signals;
   means for modulating each of said two light signals with said first frequency signal;
   a loop of fiber optic cable, said two light signals counterpropagating in opposite directions in said loop;
   means for combining said two light signals into a single light intensity signal after said two light signals have counterpropagated in said loop, the intensity of said light intensity signal varying in proportion to the phase relationship between said two light signals after said two light signals have counterpropagated in said loop, the phase relationship being proportional to any rate of rotation of the sensor; and
   detector means, for sensing said light intensity signal and for providing said rate signal in response thereto.

3. The rotation sensor of claim 2, wherein the frequency of said first frequency signal is equal to the eigenfrequency of said loop.

4. The rotation sensor of claim 1, further comprising:
   fixed phase shift means, responsive to said low frequency signal, for shifting the phase of said low frequency signal by a predetermined amount and for providing a shifted low frequency signal indicative thereof, said second demodulator means responsive to said shifted low frequency signal for demodulating said quadrature signal, whereby said predetermined phase shift amount compensates for any residual phase error between the phase of said summed signal and the phase of said variably phase shifted signal.

5. The rotation sensor of claim 2, further comprising:
   means, responsive to said demodulated rate signal, for providing a modulation signal; and
   modulating means, responsive to said modulation signal, for modulating said two light signals counterpropagating in said loop in an amount of modulation to produce a phase shift between said two light signals which will null out the shift between said two light signals caused by any rate of rotation of said loop.

6. The rotation sensor of claim 5, further comprising:
   means, responsive to said modulation signal, for providing a signal indicative of the rate of rotation of the sensor; and
   display means, responsive to said rate of rotation signal, for providing a display of the rate of rotation of the sensor.

7. The rotation sensor of claim 5, wherein said modulation signal comprises a bipolar signal having a polarity indicative of either a positive or negative rate of rotation of the fiber optic sensor.

8. The rotation sensor of claim 7, wherein said means for providing a modulation signal further comprises means, responsive to said bipolar signal, for providing a pair of signals, a first one of said pair of signals being indicative of a positive rate of rotation of the sensor, a second one of said pair of signals being indicative of a negative rate of rotation of the sensor.

9. The rotation sensor of claim 8, further comprising:
display means, responsive to said pair of signals, for providing a display of the rate of rotation of the sensor.

10. The rotation sensor of claim 1, further comprising:
means, responsive to said demodulated rate signal, for providing a display of the rate of rotation of the sensor.

* * * * *